United States Patent
Chen et al.

(10) Patent No.: US 9,241,294 B2
(45) Date of Patent: Jan. 19, 2016

(54) BASE STATION AND HANDOFF METHOD THEREOF

(71) Applicant: Institute For Information Industry, Taipei (TW)

(72) Inventors: Jen-Hui Chen, New Taipei (TW); Yu-Fang Hsiao, Guishan Township (TW); Ching-Yang Sheng, Taipei (TW); Chien-Chien Chiu, Taipei (TW)

(73) Assignee: Institute For Information Industry, Taipei (TW)

( * ) Notice: Subject to any disclaimer, the term of this patent is extended or adjusted under 35 U.S.C. 154(b) by 30 days.

(21) Appl. No.: 14/292,846

(22) Filed: May 31, 2014

(65) Prior Publication Data
US 2015/0296435 A1 Oct. 15, 2015

(30) Foreign Application Priority Data
Apr. 15, 2014 (TW) ............................... 103113650 A

(51) Int. Cl.
*H04W 36/00* (2009.01)
*H04W 36/30* (2009.01)

(52) U.S. Cl.
CPC ..................................... *H04W 36/30* (2013.01)

(58) Field of Classification Search
CPC .................... H04W 36/0016; H04W 36/0044; H04W 36/30
USPC ................................... 455/436–442; 370/331
See application file for complete search history.

(56) References Cited

U.S. PATENT DOCUMENTS

| 8,229,434 | B2 | 7/2012 | Kazmi et al. |
| 8,243,689 | B2 | 8/2012 | Youn et al. |
| 2004/0147264 | A1 | 7/2004 | Ogawa |
| 2007/0066220 | A1* | 3/2007 | Proctor et al. ............... 455/11.1 |
| 2010/0112958 | A1* | 5/2010 | Krishnamurthy et al. . 455/67.11 |
| 2012/0252460 | A1* | 10/2012 | Koskinen et al. ............. 455/438 |
| 2012/0302240 | A1 | 11/2012 | Tamaki et al. |
| 2013/0053025 | A1 | 2/2013 | Lindoff et al. |

FOREIGN PATENT DOCUMENTS

WO 2013112716 A1 8/2013

OTHER PUBLICATIONS

Office Action to the corresponding Taiwan Patent Application No. 103113650 rendered by Taiwan Intellectual Property Office (TIPO) on Oct. 26, 2015, 11 pages (including English translation).

\* cited by examiner

*Primary Examiner* — Wayne Cai
(74) *Attorney, Agent, or Firm* — Skaar Ulbrich Macari, P.A.

(57) ABSTRACT

A base station for a communication system and a handoff method thereof are provided. The base station comprises a transceiver and a processor. The transceiver receives a measurement report message with a present reference signal received quality from a wireless device. The processor electrically connected to the transceiver calculates a next report period, estimates a next reference signal received quality and adjusts a first threshold according to a variance of a reference signal received quality. The processor further enables the transceiver to transmit a first measurement control message to the wireless device according to the next report period. The handoff decision process is triggered based on the first threshold and the next reference signal received quality.

20 Claims, 3 Drawing Sheets

BASE STATION AND HANDOFF METHOD THEREOF

PRIORITY

This application claims the benefit of priority based on Taiwan Patent Application No. 103113650 filed on Apr. 15, 2014, which is hereby incorporated herein by reference in its entirety.

FIELD

The present invention relates to a base station for use in a communication system and a handoff method thereof. More particularly, the base station of the present invention dynamically calculates a next report period, estimates a next reference signal received quality and adjusts a first threshold according to a variance of a reference signal received quality (RSRQ) so that the handoff decision process is triggered based on the first threshold and the next reference signal received quality.

BACKGROUND

With the development of network technologies, the wireless communication technology has been widely used in people's daily life. To satisfy users' various demands for data transmission in different usage environments, various communication transmission technologies and standards have been developed correspondingly. The $3^{rd}$ Generation Partnership Project Evolved Universal Terrestrial Radio Access (3GPP E-UTRA) standard is just one of the communication systems that become very popular in recent years.

The handoff mechanism in the current 3GPP E-UTRA standard evaluates a present reference signal received quality (RSRQ) of a user equipment (UE) every fixed period of time, uses a fixed reference signal received quality as a threshold for triggering a handoff, and compares a signal strength received quality with the threshold to determine whether to perform execute the handoff process. In detail, the base station transmits a measurement control message (MCM) periodically based on a fixed period to the UE, and requests the UE to monitor a present reference signal received quality and transmit a measurement report message (MRM) to the base station according to the monitored reference signal received quality. When the present reference signal received quality is lower than the threshold for triggering the handoff, the handoff process is activated.

However, because a fixed reference signal received quality is used as a threshold for triggering the handoff and serves as a basis for the handoff decision in the 3GPP E-UTRA standard, a Ping-Pong effect or a situation in which a handoff is initiated too late (hereinafter referred to as a too-late handoff) is likely to occur. The Ping-Pong effect refers to a phenomenon of repeatedly performing the handoff process back and forth between two base stations when the UE approaches the edge of the two base stations' coverage. Moreover, when the UE moves at a relatively high speed, the reference signal received quality will degrade too rapidly in the handoff process due to the excessively large variance of the reference signal received quality. Consequently, the connection might be disconnected to cause failure of the handoff process.

Accordingly, an urgent need exists in the art to provide a handoff mechanism adapted to trigger the handoff process timely so as to avoid the Ping-Pong effect or a too-late handoff.

SUMMARY

An objective of certain embodiments of the present invention is to provide a handoff mechanism which can dynamically adjust the threshold for triggering a handoff and calculate the variance of the signal received quality of the UE as a basis for the handoff decision. Thereby, with the handoff mechanism of the present invention, the handoff process can be triggered timely and optimized, thus avoiding the Ping-Pong effect or a too-late handoff and improving the performance of the system in performing the handoff process.

To achieve the aforesaid objective, certain embodiments of the present invention include a base station for use in a communication system. The base station comprises a transceiver and a processor. The transceiver is configured to receive a measurement report message (MRM) with a present reference signal received quality (RSRQ) from a wireless device. The processor is electrically connected to the transceiver and configured to execute the following steps: (a) determining whether the present RSRQ is greater than a first threshold; (b) calculating a next report period according to a present RSRQ variance, a previous RSRQ variance, a present report period and a default report period when the present RSRQ is greater than the first threshold, wherein the processor enables the transceiver to transmit a first measurement control message (MCM) to the wireless device according to the next report period; (c) determining whether the present RSRQ variance is less than zero; (d) estimating a next RSRQ according to the present RSRQ variance, the present RSRQ, the present report period and the next report period, and adjusting the first threshold according to a second threshold, a handoff time, the present report period and the present RSRQ variance when the present RSRQ variance is less than zero; (e) determining whether the next RSRQ is less than the first threshold; (f) determining whether the next RSRQ is less than or equal to the second threshold when the next RSRQ is less than the first threshold; and (g) calculating a handoff request time according to the present RSRQ, the present report period, the first threshold and the present RSRQ variance when the next RSRQ is less than or equal to the second threshold, wherein the processor enables the transceiver to transmit a second MCM with a handoff request to the wireless device according to the handoff request time.

Furthermore, certain embodiments of the present invention further include a handoff method for a base station. The base station is for use in a communication system and comprises a transceiver and a processor. The transceiver receives a measurement report message (MRM) with a present reference signal received quality (RSRQ) from a wireless device. The processor is electrically connected to the transceiver. The handoff method is executed by the processor and comprises the following steps: (a) determining whether the present RSRQ is greater than a first threshold; (b) calculating a next report period according to a present RSRQ variance, a previous RSRQ variance, a present report period and a default report period when the present RSRQ is greater than the first threshold, wherein the processor enables the transceiver to transmit a first measurement control message (MCM) to the wireless device according to the next report period; (c) determining whether the present RSRQ variance is less than zero; (d) estimating a next RSRQ according to the present RSRQ variance, the present RSRQ, the present report period and the next report period, and adjusting the first threshold according to a second threshold, a handoff time, the present report period and the present RSRQ variance when the present RSRQ variance is less than zero; (e) determining whether the next RSRQ is less than the first threshold; (f) determining whether the next RSRQ is less than or equal to the second threshold when the next RSRQ is less than the first threshold; and (g) calculating a handoff request time according to the present RSRQ, the present report period, the first threshold and the present RSRQ variance when the next RSRQ is less than or equal to the second threshold, wherein the processor enables the transceiver to transmit a second MCM with a handoff request to the wireless device according to the handoff request time.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to example embodiments thereof. The present invention relates to a base station for use in a communication system and a handoff method thereof. It shall be appreciated that, these example embodiments are not intended to limit the present invention to any specific example, embodiment, environment, applications or implementations described in these example embodiments. Therefore, description of these example embodiments is only for purpose of illustration rather than to limit the present invention. The scope claimed in this application shall be governed by the claims. Additionally, in the following embodiments and the attached drawings, elements unrelated to the present invention are omitted from depiction; and dimensional relationships among individual elements in the attached drawings are illustrated only for ease of understanding, but not to limit the actual scale.

Figure 1:
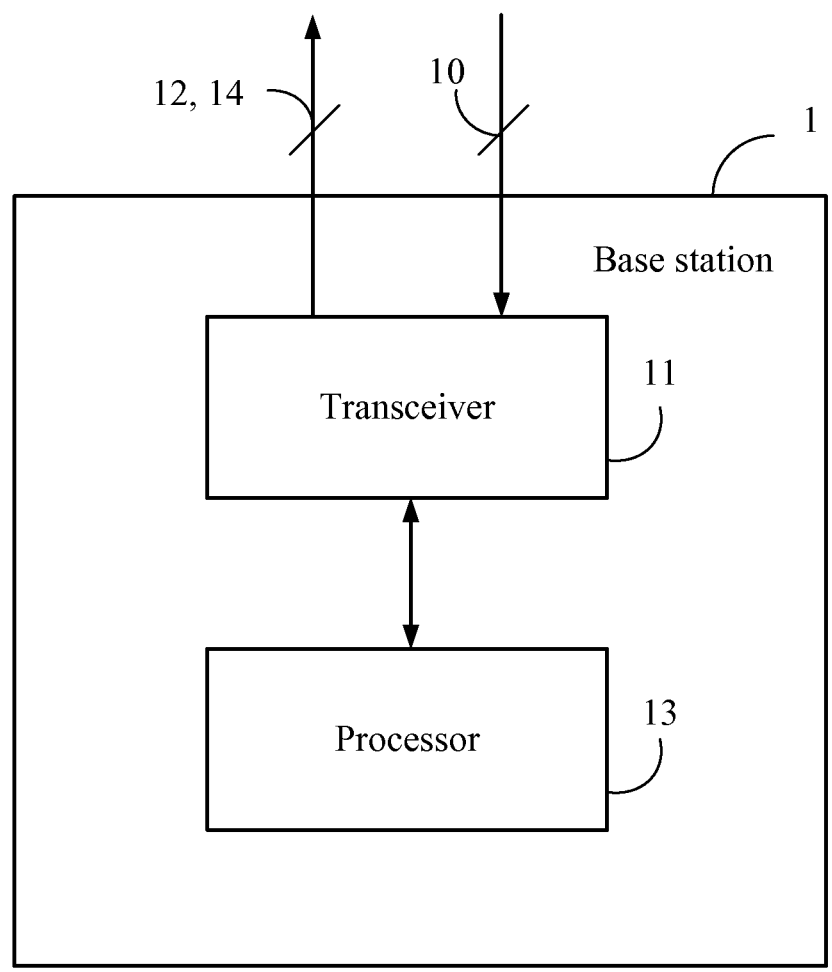
FIG. 1 is a schematic view of a base station 1 according to a first embodiment and a second embodiment of the present invention.
Figure 2A:
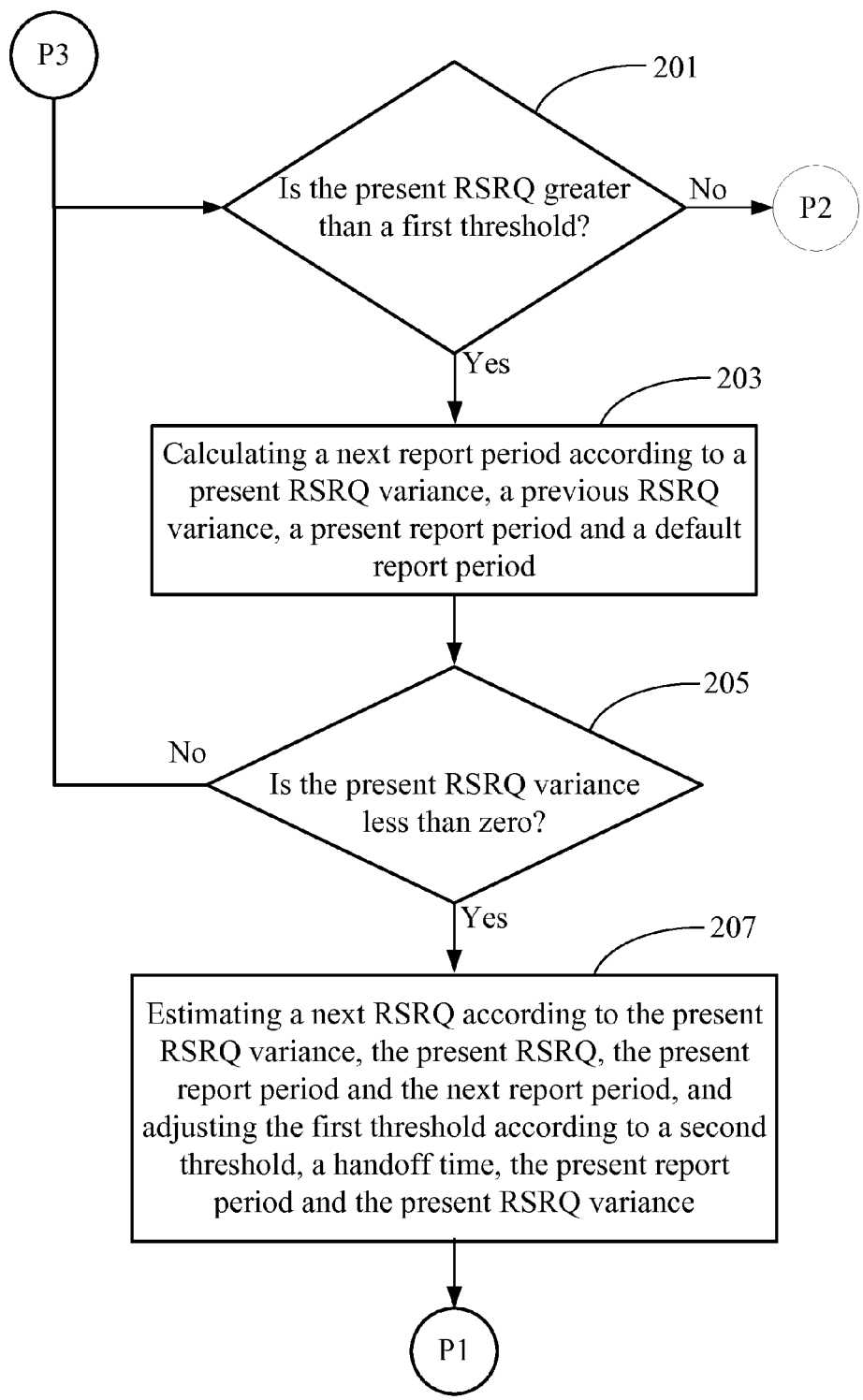
FIG. 2A and FIG. 2B are flowchart diagrams of a handoff method according to the first embodiment and the second embodiment of the present invention.
Figure 2B:
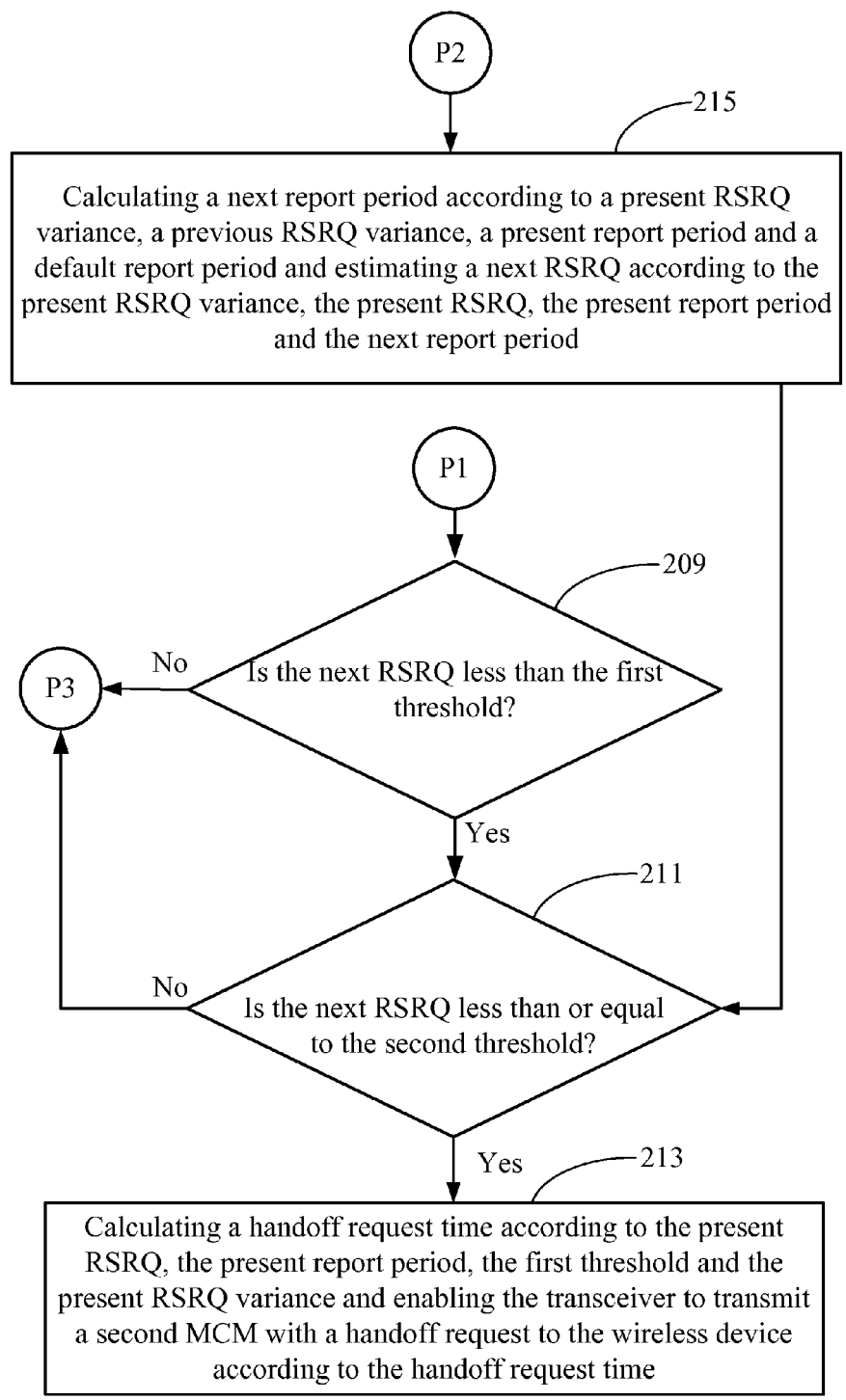

Please refer to FIG. 1, FIG. 2A and FIG. 2B for a first embodiment of the present invention. FIG. 1 is a schematic view of a base station 1 of the present invention, and FIG. 2A and FIG. 2B are flowchart diagrams of a handoff method for use in the base station 1. As shown in FIG. 1, the base station 1 comprises a transceiver 11 and a processor 13. The base station 1 is connected with a wireless device (not shown). The wireless device may be a smart phone, a tablet computer, or any other device which can be wirelessly connected with the base station 1.

The transceiver 11 is configured to receive a measurement report message (MRM) 10 from the wireless device. The MRM 10 has a present reference signal received quality (RSRQ). Specifically, RSRQ is used to represent the received signal strength of the wireless device with respect to the base station 1, and can be represented by the signal-to-interference-plus-noise-ratio (SINR). The processor 13 is electrically connected to the transceiver 11 and configured to execute a series of steps (i.e., as shown in FIG. 2A and FIG. 2B) to determine whether to trigger the handoff process.

Firstly, in step 201, the processor 13 determines whether the present RSRQ received from the wireless device by the transceiver 11 is greater than a first threshold so as to decide whether to perform the handoff process at this moment. The first threshold is a threshold for triggering the handoff, and its initial value is set by the base station 1 (e.g., set by the base station 1 according to the 3GPP E-UTRA standard). When the present RSRQ is greater than the first threshold, the processor 13 executes step 203.

In the step 203, the processor 13 calculates a next report period according to a present RSRQ variance, a previous RSRQ variance, a present report period and a default report period. The processor 13 enables the transceiver 11 to transmit a first measurement control message (MCM) 12 to the wireless device according to the next report period. In detail, the present RSRQ variance and the previous RSRQ variance represent the variance of the signal strength received by the wireless device at different time, respectively, and the default report period is a report period provided in the 3GPP E-UTRA standard, i.e., a default period in which the MCM is transmitted to the wireless device.

Then, in step 205, the processor 13 determines whether the present RSRQ variance is less than zero so as to determine the signal-receiving condition of the wireless device. When the present RSRQ variance is greater than zero, it means that the signal strength received by the wireless device is increasing, and then the processor 13 returns to execute the step 201. On the contrary, when the present RSRQ variance is less than zero, it means that the signal strength received by the wireless device is decreasing, and then the processor 13 executes step 207.

In the step 207, the processor 13 estimates a next RSRQ according to the present RSRQ variance, the present RSRQ, the present report period and the next report period, and adjusts the first threshold according to a second threshold, a handoff time, the present report period and the present RSRQ variance. It shall be appreciated that, the handoff time is a time required to perform the handoff process, and the second threshold and the handoff time are fixed values and are set according to the 3GPP E-UTRA standard.

Next, in the step 209, the processor 13 further determines whether the next RSRQ estimated in the step 207 is less than the first threshold so as to preliminarily determine whether to perform the handoff process after the next report period. It shall be appreciated that, the first threshold in the step 209 has been adjusted in the step 207. Then, if the next RSRQ is less than the first threshold, the processor 13 executes the step 211; and otherwise, the processor 13 will return to execute the step 201.

In the step 211, the processor 13 further determines whether the next RSRQ is less than or equal to the second threshold so as to preliminarily determine whether the connection in the handoff process will be disconnected. If the next RSRQ is less than or equal to the second threshold, the processor 13 executes the step 213; and otherwise, the processor 13 will return to execute the step 201. In detail, the second threshold is the lowest RSRQ required to ensure the wireless connection between the wireless device and the base station 1; and if the next RSRQ is less than the second threshold, the wireless connection between the wireless device and the base station 1 will be disconnected.

Finally, in the step 213, the processor 13 calculates a handoff request time according to the present RSRQ, the present report period, the first threshold and the present RSRQ variance. Then, the processor 13 enables the transceiver 11 to transmit a second MCM 14 with a handoff request to the wireless device according to the calculated handoff request time, as shown in FIG. 1. The second MCM 14 including a handoff request transmitted to the wireless device is used to trigger the wireless device to perform the handoff process. After receiving the second MCM 14, the wireless device performs the handoff process set by the 3GPP E-UTRA from the base station 1 to a target base station (not shown).

Moreover, in the step 201, when the present RSRQ is less than or equal to the first threshold, the processor 13 further executes the step 215 to calculate a next report period according to a present RSRQ variance, a previous RSRQ variance, a present report period and a default report period and estimate a next RSRQ according to the present RSRQ variance, the present RSRQ, the present report period and the next report period. Then, the processor 13 executes the step 211 after executing the step 215. It shall be appreciated that, the terms "first" and "second" used to designate the first MCM and the second MCM of this embodiment are only for ease of descriptions, and are not used to specify the time sequence.

As an extension of the first embodiment, a second embodiment of the present invention is also shown in FIG. 1, FIG. 2A and FIG. 2B. Firstly, in the step 203, the processor 13 calculates the next report period $T_{n-1}$ according to an equation 1:

$$T_{n+1} = \min\left(T_p, \frac{\Delta\psi_{n-1}}{\Delta\psi_n}T_n\right) \quad \text{(Equation 1)}$$

$T_{n+1}$ is the next report period, $\Delta\psi_n$ is the present RSRQ variance, $\Delta\psi_{n-1}$ is the previous RSRQ variance, $T_n$ is the present report period, $T_p$ is the default report period and $\Delta\psi_n = \psi_n - \psi_{n-1}\cdot\psi_n$ is the present RSRQ and $\psi_{n-1}$ is a previous RSRQ.

In the step 207, the processor 13 estimates the next RSRQ $\psi_{n+1}$ according to an equation 2:

$$\psi_{n+1} = \psi_n + \frac{T_{n+1}}{T_n}\Delta\psi_n \quad \text{(Equation 2)}$$

$\psi_{n+1}$ is the next RSRQ. The processor 13 further adjusts the first threshold $\psi_{h1}$ according to an equation 3:

$$\psi_{h1} = \psi_{h2} - \frac{T_H}{T_n}\Delta\psi_n \quad \text{(Equation 3)}$$

$\psi_{h1}$ is the first threshold, $\psi_{h2}$ is the second threshold, and $T_H$ is the handoff time. It shall be noted that, the second threshold $\psi_{h2}$ and the handoff time $T_H$ are fixed values which are set according to the 3GPP E-UTRA standard. In the step 211, the processor 13 determines whether the next RSRQ $\psi_{n+1}$ is less than or equal to the second threshold $\psi_{h2}$ according to an equation 4:

$$\frac{|\Delta\psi_{n+1}|}{T_{n+1}} \geq \frac{\psi_{n+1} - \psi_{h2}}{T_H} \quad \text{(Equation 4)}$$

$\Delta\psi_{n+1} = \psi_{n+1} - \psi_n$. When the equation 4 is satisfied, the connection is insecure, and then the processor 13 further executes the step 213. Finally, in the step 213, the processor 13 calculates the handoff request time $T_d$ according to an equation 5:

$$T_d = \left|\frac{\psi_{h1} - \psi_n}{\Delta\psi_n}\right|T_n \quad \text{(Equation 5)}$$

Thereafter, the processor 13 enables the transceiver 11 to transmit a second MCM 14 with a handoff request to the wireless device according to the handoff request time $T_d$.

Furthermore, in the step 215, the processor 13 calculates the next report period $T_{n+1}$ according to the equation 1 and estimates the next RSRQ $\psi_{n+1}$ according to the equation 2.

According to the above descriptions, the base station and the handoff method of the present invention dynamically adjust the report period in which the base station transmits the MCM to the wireless device and dynamically adjust the first threshold for triggering the handoff according to the RSRQ variance of the wireless device so as to determine whether to perform the handoff process according to the handoff mechanism. Accordingly, as compared with the conventional handoff mechanism which is based on a fixed report period and a fixed threshold for triggering the handoff, the handoff mechanism of the present invention can trigger the handoff process timely and optimize the handoff process, thereby avoiding the Ping-Pong effect or a too-late handoff and improving the performance of the handoff process.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A base station for use in a communication system, comprising:
   a transceiver, being configured to receive a measurement report message (MRM) with a present reference signal received quality (RSRQ) from a wireless device; and
   a processor, being electrically connected to the transceiver and configured to execute the following steps:
   (a) determining whether the present RSRQ is greater than a first threshold;
   (b) calculating a next report period according to a present RSRQ variance, a previous RSRQ variance, a present report period and a default report period when the present RSRQ is greater than the first threshold, wherein the processor enables the transceiver to transmit a first measurement control message (MCM) to the wireless device according to the next report period;
   (c) determining whether the present RSRQ variance is less than zero;
   (d) estimating a next RSRQ according to the present RSRQ variance, the present RSRQ, the present report period and the next report period, and adjusting the first threshold according to a second threshold, a handoff time, the present report period and the present RSRQ variance when the present RSRQ variance is less than zero;
   (e) determining whether the next RSRQ is less than the first threshold;
   (f) determining whether the next RSRQ is less than or equal to the second threshold when the next RSRQ is less than the first threshold; and
   (g) calculating a handoff request time according to the present RSRQ, the present report period, the first threshold and the present RSRQ variance when the next RSRQ is less than or equal to the second threshold, wherein the processor enables the transceiver to transmit a second MCM with a handoff request to the wireless device according to the handoff request time.

2. The base station as claimed in claim 1, wherein the step (b) calculates the next report period according to the following equation:

$$T_{n+1} = \min\left(T_p, \frac{\Delta\psi_{n-1}}{\Delta\psi_n}T_n\right);$$

wherein $T_{n+1}$ is the next report period, $\Delta\psi_2$ is the present RSRQ variance, $\Delta\psi_{n-1}$ is the previous RSRQ variance, $T_n$ is the present report period, $T_p$ is the default report period and $\Delta\psi_n = \psi_n - \psi_{n-1}$, wherein $\psi_n$ is the present RSRQ and $\psi_{n-1}$ is a previous RSRQ.

3. The base station as claimed in claim 1, wherein the step (d) estimates the next RSRQ according to the following equation:

$$\psi_{n+1} = \psi_n + \frac{T_{n+1}}{T_n}\Delta\psi_n;$$

wherein $\psi_{n+1}$ is the next RSRQ, $\psi_n$ is the present RSRQ, $T_{n+1}$ is the next report period, $T_n$ is the present report period, $\Delta\psi_n$ is the present RSRQ variance and $\Delta\psi_n = \psi_n - \psi_{n-1}$, wherein $\psi_{n-1}$ is a previous RSRQ; and the step (d) adjusts the first threshold according to the following equation:

$$\psi_{h1} = \psi_{h2} + \frac{T_H}{T_n}\Delta\psi_n;$$

wherein $\psi_{h1}$ is the first threshold, $\psi_{h2}$ is the second threshold, $T_n$ is the present report period, $T_H$ is the handoff time, $\Delta\psi_n$ is the present RSRQ variance and $\Delta\psi_n = \psi_n - \psi_{n-1}$, wherein $\psi_n$ is the present RSRQ and $\psi_{n-1}$ is a previous RSRQ.

4. The base station as claimed in claim 1, wherein the step (f) determines whether the next RSRQ is less than or equal to the second threshold according to the following equation:

$$\frac{|\Delta\psi_{n+1}|}{T_{n+1}} \geq \frac{\psi_{n+1} - \psi_{h2}}{T_H};$$

wherein $\psi_{n+1}$ is the next RSRQ, $\psi_{h2}$ is the second threshold, $T_{n+1}$ is the next report period, $T_H$ is the handoff time and $\Delta\psi_{n+1} = \psi_{n+1} - \psi_n$, wherein $\psi_n$ is the present RSRQ and $\psi_{n+1}$ is the next RSRQ;

wherein the processor executes the step (g) when the equation is satisfied.

5. The base station as claimed in claim 1, wherein the step (g) calculates the handoff request time according to the following equation:

$$T_d = \left|\frac{\psi_{h1} - \psi_n}{\Delta\psi_n}\right|T_n;$$

wherein $T_d$ is the handoff request time, $\psi_{h1}$ is the first threshold, $T_n$ is the present report period, $\psi_n$ is the present RSRQ, $\Delta\psi_n$ is the present RSRQ variance and $\Delta\psi_n = \psi_n - \psi_{n-1}$, wherein $\psi_{n-1}$ is a previous RSRQ.

6. The base station as claimed in claim 1, wherein when the present RSRQ is less than or equal to the first threshold in the step (a), the processor further executes the step (f) after executing the following steps:

calculating the next report period according to the present RSRQ variance, the previous RSRQ variance, the present report period and the default report period; and estimating the next RSRQ according to the present RSRQ variance, the present RSRQ, the present report period and the next report period.

7. The base station as claimed in claim 1, wherein when the present RSRQ variance is greater than or equal to zero in the step (c), the processor returns to execute the step (a).

8. The base station as claimed in claim 1, wherein when the next RSRQ is greater than or equal to the first threshold in the step (e), the processor returns to execute the step (a).

9. The base station as claimed in claim 1, wherein when the next RSRQ is greater than the second threshold in the step (f), the processor returns to execute the step (a).

10. The base station as claimed in claim 1, wherein the communication system conforms to a Third Generation Partnership Project Evolved Universal Terrestrial Radio Access (3GPP E-UTRA) standard.

11. A handoff method for a base station in a communication system, the base station comprising a transceiver and a processor, the transceiver receiving a measurement report message (MRM) with a present reference signal received quality (RSRQ) from a wireless device, the processor being electrically connected to the transceiver, the handoff method executed by the processor and comprising the following steps:

(a) determining whether the present RSRQ is greater than a first threshold;

(b) calculating a next report period according to a present RSRQ variance, a previous RSRQ variance, a present report period and a default report period when the present RSRQ is greater than the first threshold, wherein the processor enables the transceiver to transmit a first measurement control message (MCM) to the wireless device according to the next report period;

(c) determining whether the present RSRQ variance is less than zero;

(d) estimating a next RSRQ according to the present RSRQ variance, the present RSRQ, the present report period and the next report period, and adjusting the first threshold according to a second threshold, a handoff time, the present report period and the present RSRQ variance when the present RSRQ variance is less than zero;

(e) determining whether the next RSRQ is less than the first threshold;

(f) determining whether the next RSRQ is less than or equal to the second threshold when the next RSRQ is less than the first threshold; and (g) calculating a handoff request time according to the present RSRQ, the present report period, the first threshold and the present RSRQ variance, and enabling the transceiver to transmit a second MCM with a handoff request to the wireless device according to the handoff request time when the next RSRQ is less than or equal to the second threshold.

12. The handoff method as claimed in claim 11, wherein the step (b) calculates the next report period according to the following equation:

$$T_{n+1} = \min\left(T_p, \frac{\Delta\psi_{n-1}}{\Delta\psi_n} T_n\right);$$

wherein $T_{n+1}$ is the next report period, $\Delta\psi_2$ is the present RSRQ variance, $\Delta\psi_{n-1}$ is the previous RSRQ variance, $T_n$ is the present report period, $T_p$ is the default report period and $\Delta\psi_n = \psi_n - \psi_{n-1}$, wherein $\psi_n$ is the present RSRQ and $\psi_{n-1}$ is a previous RSRQ.

13. The handoff method as claimed in claim 11, wherein the step (d) estimates the next RSRQ according to the following equation:

$$\psi_{n+1} = \psi_n + \frac{T_{n+1}}{T_n}\Delta\psi_n;$$

wherein $\psi_{n+1}$ is the next RSRQ, $\psi_n$ is the present RSRQ, $T_{n+1}$ is the next report period, $T_n$ is the present report period, $\Delta\psi_n$ is the present RSRQ variance and $\Delta\psi_n = \psi_n - \psi_{n-1}$, wherein $\psi_{n-1}$ is a previous RSRQ; and the step (d) adjusts the first threshold according to the following equation:

$$\psi_{h1} = \psi_{h2} - \frac{T_H}{T_n}\Delta\psi_n;$$

wherein $\psi_{h1}$ is the first threshold, $\psi_{h2}$ is the second threshold, $T_n$ is the present report period, $T_H$ is the handoff time, $\Delta\psi_n$ is the present RSRQ variance and $\Delta\psi_n = \psi_n - \psi_{n-1}$, wherein $\psi_n$ is the present RSRQ and $\psi_{n-1}$ is a previous RSRQ.

14. The handoff method as claimed in claim 11, wherein the step (f) determines whether the next RSRQ is less than or equal to the second threshold according to the following equation:

$$\frac{|\Delta\psi_{n+1}|}{T_{n+1}} \geq \frac{\psi_{n+1} - \psi_{h2}}{T_H};$$

wherein $\psi_{n+1}$ is the next RSRQ, $\psi_{h2}$ is the second threshold, $T_{n+1}$ is the next report period, $T_H$ is the handoff time and $\Delta\psi_{n+1} = \psi_{n+1} - \psi_n$, wherein $\psi_n$ is the present RSRQ and $\psi_{n+1}$ is the next RSRQ;

wherein the processor executes the step (g) when the equation is satisfied.

15. The handoff method as claimed in claim 11, wherein the step (g) calculates the handoff request time according to the following equation:

$$T_d = \left|\frac{\psi_{h1} - \psi_n}{\Delta\psi_n}\right| T_n;$$

wherein $T_d$ is the handoff request time, $\psi_{h1}$ is the first threshold, $T_n$ is the present report period, $\psi_n$ is the present RSRQ, $\Delta\psi_n$ is the present RSRQ variance and $\Delta\psi_n = \psi_n - \psi_{n-1}$, wherein $\psi_{n-1}$ is a previous RSRQ.

16. The handoff method as claimed in claim 11, wherein when the present RSRQ is less than or equal to the first threshold in the step (a), the processor further executes the step (f) after executing the following steps:

calculating the next report period according to the present RSRQ variance, the previous RSRQ variance, the present report period and the default report period; and estimating the next RSRQ according to the present RSRQ variance, the present RSRQ, the present report period and the next report period.

17. The handoff method as claimed in claim 11, wherein when the present RSRQ variance is greater than or equal to zero in the step (c), the processor returns to execute the step (a).

18. The handoff method as claimed in claim 11, wherein when the next RSRQ is greater than or equal to the first threshold in the step (e), the processor returns to execute the step (a).

19. The handoff method as claimed in claim 11, wherein when the next RSRQ is greater than the second threshold in the step (f), the processor returns to execute the step (a).

20. The handoff method as claimed in claim 11, wherein the communication system conforms to a Third Generation Partnership Project Evolved Universal Terrestrial Radio Access (3GPP E-UTRA) standard.

* * * * *